United States Patent
Wong

(10) Patent No.: US 8,654,716 B2
(45) Date of Patent: Feb. 18, 2014

(54) SYSTEM AND METHOD FOR NAME BINDING FOR MULTIPLE PACKET DATA NETWORK ACCESS

(75) Inventor: Marcus Wong, Green Brook, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 660 days.

(21) Appl. No.: 12/618,143

(22) Filed: Nov. 13, 2009

(65) Prior Publication Data

US 2010/0124198 A1    May 20, 2010

Related U.S. Application Data

(60) Provisional application No. 61/114,650, filed on Nov. 14, 2008.

(51) Int. Cl.
  *H04W 4/00*  (2009.01)
  *H04L 12/56*  (2011.01)
  *H04L 12/28*  (2006.01)
  *G06F 15/16*  (2006.01)

(52) U.S. Cl.
  USPC ... 370/329; 370/392; 370/395.2; 370/395.54; 709/228; 455/435.1

(58) Field of Classification Search
  USPC .......... 370/328–331, 392, 395.2, 395.54; 455/411, 435.1–444, 448; 709/227–229
  See application file for complete search history.

(56) References Cited

U.S. PATENT DOCUMENTS

| | | | |
|---|---|---|---|
| 2008/0254768 A1 | 10/2008 | Faccin | |
| 2009/0043902 A1* | 2/2009 | Faccin | 709/229 |
| 2009/0263122 A1 | 10/2009 | Helkey et al. | |
| 2011/0199987 A1* | 8/2011 | Rommer et al. | 370/329 |

FOREIGN PATENT DOCUMENTS

| | | |
|---|---|---|
| CN | 1852304 A | 10/2006 |
| CN | 101291283 A | 10/2008 |
| CN | 101420737 A | 4/2009 |
| CN | 101547142 A | 9/2009 |
| JP | 2009080050 A | 4/2009 |
| WO | WO 03/015353 A1 | 2/2003 |
| WO | WO 2008/127662 A1 | 10/2008 |

OTHER PUBLICATIONS

ETSI TS 123 402, V8.3.0, 3GPP, Nov. 4, 2008,http://pda.etsi.org/exchangefolder/ts_123402v080300p.pdf.*
GSM-UMTS-3GPP Numbering Cross Reference.*
3GPP TS 23.402 version 8.3.0 Release 8 73 ETSI TS 123 402 V8.3.0 (Nov. 2008) (2 pages).*

(Continued)

*Primary Examiner* — Habte Mered
(74) *Attorney, Agent, or Firm* — Slater & Matsil, L.L.P.

(57) ABSTRACT

A system and method for name binding for multiple packet data network access is provided. A method for communications device operation includes attaching to a first packet data network through an access network, thereby creating an access point name, triggering a connection to a second packet data network through the access network, and receiving an acknowledgement to the trigger. The triggering occurs over the access point name, and the acknowledgement comprises an address for the communications device. The address is allocated by a gateway for the second packet data network, and the address is allocated based on a binding generated from an identifier of the communications device, an identifier of the access point name, and a parameter.

22 Claims, 4 Drawing Sheets

(56) References Cited

OTHER PUBLICATIONS

3GPP TS 23.402 V8.7.0 (Sep. 2009), Release 8, "Functional Description and Procedures for Trusted Non-3GPP IP Accesses," Section 6, pp. 75-112.

3GPP TS 23.402 V8.7.0 (Sep. 2009), Release 8, "Handover Flows Between Non-3GPP Accesses," Annex C, pp. 182-186.

"International Search Report and Written Opinion," International Application No. PCT/CN2010/077909, Applicant: Huawei Technologies Co., Ltd., et al., mailing date: Jan. 27, 2011, 12 pages.

WiMAX Forum Network Working Group, "WiMAX—3GPP EPS Interworking," Version 0.17, Section 14, 2008, pp. 32-36.

"3rd Generation Partnership Project; Technical Specification Group Services and System Aspects; Architecture enhancements for non-3GPP accesses (Release 8)," 3GPP TS 23.402, V8.2.0, Jun. 2008, 180 pages.

Search Report received in Chinese Application No. 200980144331X, dated Sep. 26, 2012, 2 pages.

3rd Generation Partnership Project, "Technical Specification Group Services and System Aspects; Architecture Enhancements for Non-3GPP Accesses (Release 8)," 3GPP TS 23.402, v8.3.0, Sep. 2008, 190 pages.

Uchimura, Yutaka, "IEEE 802.11 Timing Synchronization Based Wireless Sensor System for Vibration Measurement," The University Electro-Communications, Aug. 20-22, 2008, pp. 1698-1703.

Second Office Action of Chinese Application No. 200980144331.X, mailing date: Jun. 6, 2013, 5 pages (with partial translation).

* cited by examiner

SYSTEM AND METHOD FOR NAME BINDING FOR MULTIPLE PACKET DATA NETWORK ACCESS

This application claims the benefit of U.S. Provisional Application No. 61/114,650, filed on Nov. 14, 2008, entitled "Mobile Station to Access Point Name Binding for Multiple Packet Data Network Access," which application is hereby incorporated herein by reference.

TECHNICAL FIELD

The present invention relates generally to wireless communications, and more particularly to a system and method for name binding for multiple packet data network access.

BACKGROUND

Wireless access networks, such as the Long Term Evolution and Long Term Evolution-Advanced by the Third Generation Partnership Project (3GPP), WiMAX, variants of IEEE 802.11, and so forth, have allowed users to connect to a wide range of packet data networks (PDN) after the user's communications device (commonly referred to as User Equipment (UE), mobile station (MS), terminal, access terminal, and so on) attaches to the wireless access network. For example, after the UE attaches to the wireless access network, the UE may attach to a PDN, such as a corporate network, the Internet, a multimedia messaging system (MMS), or other networks.

FIG. 1 illustrates a prior art communications network 100. Communications network 100 includes an access network 105, for example, a 3GPP access network. Access network 105 may include a wireless access network 107 and a core network 109. Wireless access network 107 may include a plurality of communications controllers, such as NodeBs, enhanced NodeBs, base stations, base terminal stations, access points, and so forth, that may be used to control communications to and from UE attached to access network 105. Core network 109 may include components that may be responsible for ensuring network operation, such as mobility management entities (MME), serving gateways (SGW), an authentication, authorization and accounting (AAA) server, and PDN gateways (PDN GW).

Communications network 100 also includes a UE 110 that may be attached to access network 105. UE 110 may utilize access network 105 to connect to one or more PDNs, such as a corporate network (PDN #1) 115, the Internet (PDN #2) 117, a MMS (PDN #3) 119, or so on. For each additional PDN connection, a PDN GW, part of the access network's core network, creates a binding cache entry for the UE and based on the binding cache entry, the UE may either be allocated an additional Internet Protocol (IP) address or prefix. With an address (IP address or prefix) assigned, an IP session tunnel may be established between a mobile access gateway (MAG) and the PDN GW so that the UE's IP traffic from the connected PDN may be routed to the UE.

For example, when UE 110 is connected to PDN #1 (corporate network 115), a first access point name (APN) 120 may be created to route IP traffic between UE 110 and PDN #1, while when UE 110 is connected to PDN #2 (the Internet 117), a second APN 122 may be created to route IP traffic between UE 110 and PDN #2. Because distinct APNs are used for each connection, each APN may be assigned a different name; for example, first APN 120 may be referred to as APN #1 and second APN 122 may be referred to as APN #2.

Since each connection between UE 110 and a PDN utilizes a unique APN, a distinct binding cache entry is required for each connection.

SUMMARY OF THE INVENTION

These and other problems are generally solved or circumvented, and technical advantages are generally achieved, by embodiments of a system and method for name binding for multiple packet data network access.

In accordance with an embodiment, a method for communications device operation is provided. The method includes attaching to a first packet data network through an access network, thereby creating an access point name, triggering a connection to a second packet data network through the access network, and receiving an acknowledgement to the trigger. The triggering occurs over the access point name, and the acknowledgement comprises an address for the communications device. The address is allocated by a gateway for the second packet data network, and the address is allocated based on a binding generated from an identifier of the communications device, an identifier of the access point name, and a parameter.

In accordance with another embodiment, a method for mobility access gateway (MAG) operation is provided. The method includes receiving a trigger for a connection to an alternate packet data network (PDN) from a communications device already connected to a PDN, forming the connection to an alternate PDN, receiving an address of the communications device from a gateway of the alternate PDN, and sending a reply to the trigger, wherein the reply comprises the address of the communications device provided by the gateway of the alternate PDN. The trigger is received on an access point name created during a connection of the communications device to the PDN, and the address is allocated based on a binding generated from an identifier of the communications device, an identifier of the access point name, and a parameter.

In accordance with another embodiment, a method for packet data network gateway (PDN GW) operation is provided. The method includes receiving a proxy binding update from a mobility access gateway (MAG), the proxy binding update includes a message requesting a establishing connection between the MAG and the PDN GW for a communications device over an access point name established during a previous establishing of a connection between the MAG and a PDN, authenticating the communications device, allocating an address for the communications device, and establishing a tunnel between the PDN GW and the MAG. The address is allocated based on a binding generated from an identifier of the communications device, an identifier of the access point name, and a parameter.

An advantage of an embodiment is that a single binding cache entry may be used for all PDN connections used by a UE. Therefore, binding cache resource utilization is minimized, allowing for a smaller binding cache to support a large number of UEs. Thereby reducing deployment costs.

Another advantage of an embodiment is that deployment cost may be minimized by reducing the number of access points necessary to serve UEs making multiple PDN connections.

A further advantage of an embodiment is that multiple PDN connections to a single APN from a single UE may be identified. Therefore, a variety of service charging options for communications system operators may be enabled, such as charging on a per connection basis.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a communications system with a 3GPP access network, such as Long Term Evolution or Long Term Evolution-Advanced access network. The invention may also be applied, however, to other communications systems with different access networks, such as communications systems with a WiMAX access network, a variant of IEEE 802.11 access network, or any other type of access network that allows interworking with a 3GPP access network.

Figure 1:
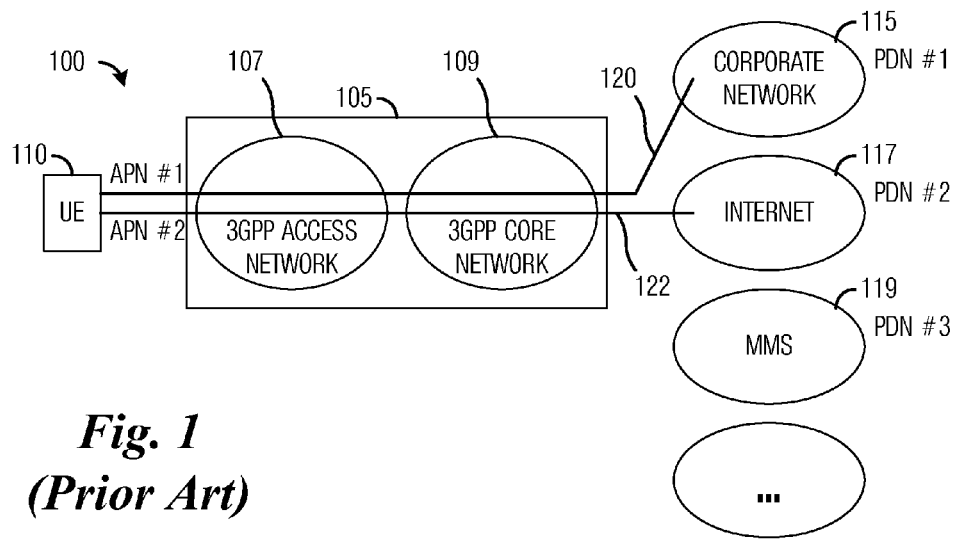
FIG. 1 is a diagram of a prior art communications network.

Although communications system 100, shown in FIG. 1, allows a single UE (such as UE 110) to connect to multiple PDNs, each connection between UE 110 and a PDN requires a separate APN and a corresponding binding cache entry. Allocating a separate APN and corresponding binding cache entry for each connection between a UE and a PDN may require an operator of communications system 100 to dedicate a large amount of resources, such as access points, binding cache entries, and so forth, to the operation of communications system 100.

Figure 2:
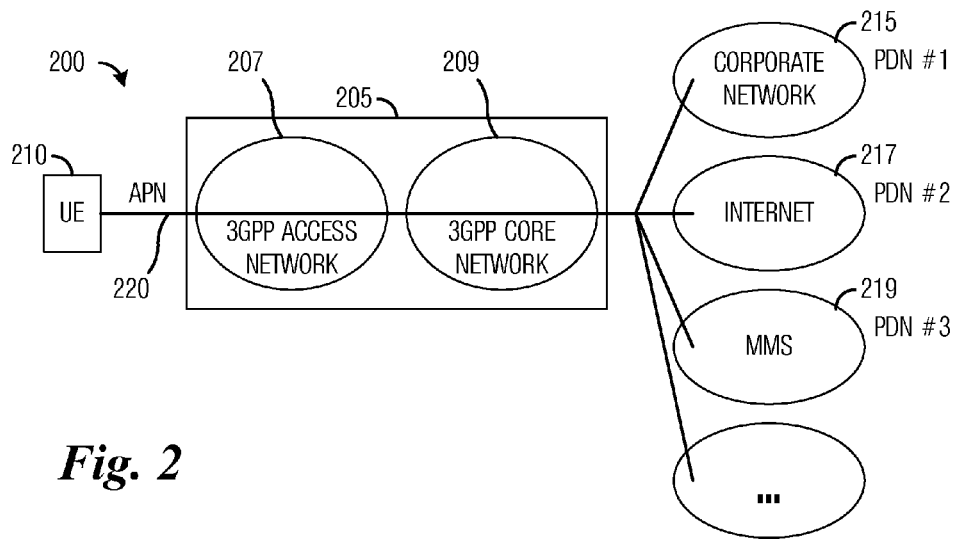
FIG. 2 is a diagram of a communications network that uses an APN for all connections between a UE and multiple PDNs.

FIG. 2 illustrates a communications network 200 that uses a single APN for all connections between a UE and multiple PDNs. Communications network 200 includes an access network 205, for example, a 3GPP access network. Access network 205 may include a wireless access network 207 and a core network 209. Communications network 200 also includes a UE 210. UE 210 may utilize access network 205 to connect to one or more PDNs, such as a corporate network (PDN #1) 115, the Internet (PDN #2) 117, a MMS (PDN #3) 119, or so on.

For a first connection between UE 210 and a first PDN, a first PDN GW creates a single APN (APN 220), a single corresponding binding cache entry for UE 210, and allocates a first IP address or prefix to UE 210. The first IP address (or prefix) may be based on a binding. The binding may be generated as a combination of an identifier of UE 210 (MN-ID) and an APN identifier (APN-ID). For example, the binding may be a concatenation of MN-ID and APN-ID, a hash of MN-ID and APN-ID, an addition of MN-ID and APN-ID, or any one of a wide variety of functions that may be used to combine values. It may be assumed that the generation of bindings within a single communications system will always use the identical binding generation technique.

If a second connection between UE 210 and a second PDN is created, a second PDN GW does not create another APN. Instead, APN 220 created for the first connection may be used for the second connection. The second PDN GW may allocate a second IP address or prefix to UE 210 for the second connection. However, if the binding used for the second connection is also a combination of MN-ID and APN-ID, then the bindings of the first connection and the second connection may be the same. For communications network 100 where each connection between a UE and a PDN uses a distinct APN, IP address allocation based on bindings that are a combination of MN-ID and APN-ID may be sufficient. However, when a single APN (e.g., APN 220) is shared between multiple connections between a UE and different PDNs, distinct IP addresses for the UE are required to distinguish IP traffic from different connections. Therefore, IP address allocation based solely on bindings that are combinations of MN-ID and APN-ID may not be sufficient to distinguish IP traffic for the different connections.

One technique that allows for the sharing of a single PDN with multiple connections between a UE and PDNs is to allow only a single active connection between the UE and a PDN. Therefore, after creating a first connection between the UE and a first PDN, if the UE desires to establish a second connection between itself and a second PDN, the UE (or the PDN GW) must tear down the first connection between the UE and the first PDN. With only one active connection on the APN, there may be no IP address confusion.

Figure 3:
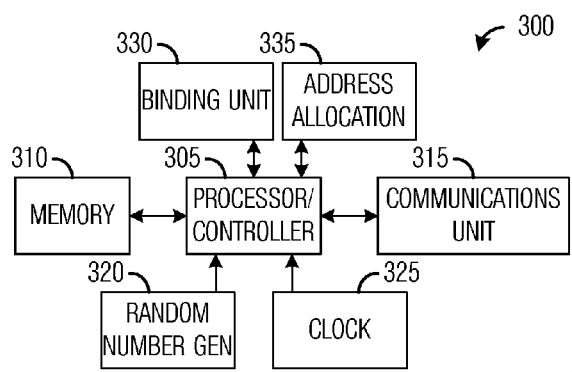
FIG. 3 is a diagram of a PDN GW.

FIG. 3 illustrates a PDN GW 300. As discussed previously, PDN GW 300 may be located in a core network, such as core network 209, of an access network, such as access network 205. PDN GW 300 may allow for a UE, such as UE 210, to connect to a PDN and may function as an exit and an entry point for traffic to and from the UE. PDN GW 300 may be used to perform tasks such as packet filtering, charging for services, packet screening, APN creation and maintenance, IP address allocation, creating/maintaining binding cache entries, and so forth.

PDN GW 300 includes a processor 305 that may be responsible for performing tasks such as packet filtering, charging for services, packet screening, APN creation and maintenance, IP address allocation, creating/maintaining binding cache entries, and so on. A memory 310 may be used to store information and data used by PDN GW 300. For example, memory 310 may be used to store a binding cache, charging database, and so forth. A communications unit 315 may allow PDN GW 300 to communicate with communications devices, such as UEs, as well as network hardware.

A random number generator 320 may be used to generate random numbers, such as a nonce, to be used in some of the tasks performed by PDN GW 300. A clock 325 may be used to maintain system time, as well as potentially performing timing operations. A binding unit 330 may be used to generate a binding from information provided by processor 305. For example, binding unit 330 may generate a binding based on a MN-ID and APN-ID provided by PDN GW 300. The binding may be used to allocate IP address from a pool of available IP addresses stored in the network by address allocation unit 335.

As discussed previously, if multiple simultaneous connections between a UE and PDNs are permitted over a single APN, then the allocation of an IP address based on bindings that are a combination of MN-ID and APN-ID may not be sufficient to ensure that IP addresses allocated to the UE for each connection is unique. If the IP addresses are not unique, then confusion may occur when routing IP packets to the UE from the different PDNs, leading to security errors and/or charging issues. Additional information may be needed to help ensure that the allocated IP addresses are unique. However, the additional information should be kept to a minimum and as simple as possible to minimize impact on current PDN GW implementations as well as cost.

According to an embodiment, the allocation of an IP address may be based on bindings generated using MN-ID, APN-ID, and an additional parameter may be sufficient to ensure that the IP addresses allocated to a UE for each connection is unique, when the additional parameter comprises a counter value, a nonce, a system time, an identifier of the PDN to which the connection is being made, or so forth.

Figure 4:
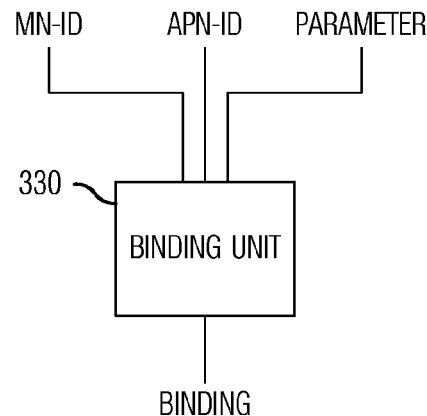
FIG. 4 is a diagram of a binding unit.

FIG. 4 illustrates binding unit 330. Binding unit 330 may have as input values from which it may use to generate a binding value. According to an embodiment, inputs to binding unit 330 include MN-ID, APN-ID, and a parameter (one of the following: a counter value, a nonce, a system time value, or an identifier of the PDN).

Binding unit 330 may then generate the binding by combining the three values provided at its inputs. For example, binding unit 330 may concatenate the three values. Alternatively, binding unit 330 may use a hash function to combine the three values. The hash function used by binding unit 330 may produce a value (the binding) of fixed length, independent of the size of the three values. Therefore, there may be a chance that certain combinations of the three values may produce non-unique results. However, with a properly selected hash function, the probability of producing non-unique results may be very small. It may also be possible to simply add (or some other mathematical operation) the three values together. In general, there may be a wide range of operations that may be applied to the three values to generate the binding. The operation selected should be able to generate the binding with no (or very few) non-unique results.

In the case of the parameter being a counter value, the counter value may be maintained in a counter stored at a PDN GW and may be associated with the UE, i.e., each UE may have its own counter. By dedicating a counter for each UE, the counter size may be small, on the order of a few bits. The counter may be set to an initial value when the UE to which it is associated attaches to the access network. Then, as the UE establishes connections to a PDN, the counter may be incremented (or decremented) and the counter value may be used, in combination with MN-ID and APN-ID, to generate the binding for the UE for the connection to the PDN.

Figure 5:
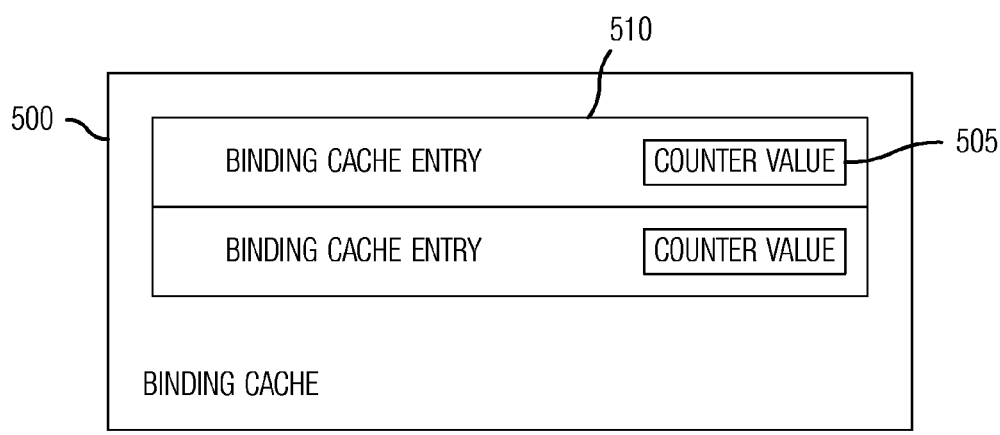
FIG. 5 is a diagram of a binding cache modified to generate a binding for use in IP address allocation with a counter value.

FIG. 5 illustrates a binding cache modified for use in binding value generation with a counter value. The counter value may be stored in the binding cache entry for the UE, such as counter value store 505 in entry 510. Counter value store 505 (as well as other counter value stores) may need to be sized so that it is sufficiently large to store the counter value. Storing counter values in a binding cache entry for the UE allows for the association of a counter for each UE, while requiring very little additional resources.

According to an embodiment, the counter value may be monotonically increasing (or monotonically decreasing), with the counter value being incremented (or decremented) each time a connection between a UE that it is associated with and a PDN is established. A monotonic counter may help to prevent ambiguities that may occur if the counter value is decremented (or incremented) each time that an existing connection between the UE and a PDN is deleted. The ambiguities may have an adverse impact on charging for services, reallocating an IP address already in use, and so forth. The counter may only be reset when the binding cache entry for a UE is deleted.

In the case of the parameter being a nonce, since a nonce is generally a random or pseudo-random number that may be used just once, a random number generator, such as random number generator 320 in PDN GW 300, may be used to generate the nonce when a connection between the UE and a PDN is established. Once the nonce is generated, the nonce may be stored in a binding cache entry for the UE in a manner similar to the way that the counter value is stored in the binding cache entry (as shown in FIG. 5).

Since a random number generator may be used for other purposes, such as in packet collision avoidance schemes, challenge-response schemes and cryptographic key generation schemes in a variety of security functions, the use of a nonce as a parameter for generating an IP address may not require the addition of any extra hardware.

In the case of the parameter being a system time value, when a connection between the UE and a PDN is established, the system time value of a system clock, such as clock 325 of PDN GW 300, may be used to generate the binding. According to an embodiment, the system time value of when the PDN GW 300 receives a proxy binding update (PBU) from a media access gateway (MAG) may be used in the generating of the binding. Alternatively, the system time value of when the UE initiates the connection with the PDN may be used in the generation of the binding. As with the counter value and the nonce, the system time value may be stored in a binding cache entry for the UE.

Since a system clock has a wide range of uses other than in generating a binding, the use of the system time value in the generating of a binding may not require the addition of any extra hardware.

In the case of the parameter being an identifier of the PDN, an IP address of the PDN or a fully qualified domain name of the PDN, for example, may be used in conjunction with the MN-ID and the APN-ID to generate the binding. The identifier of the PDN may be retrieved from a domain name server or some other database located in the communications system.

Figure 6:
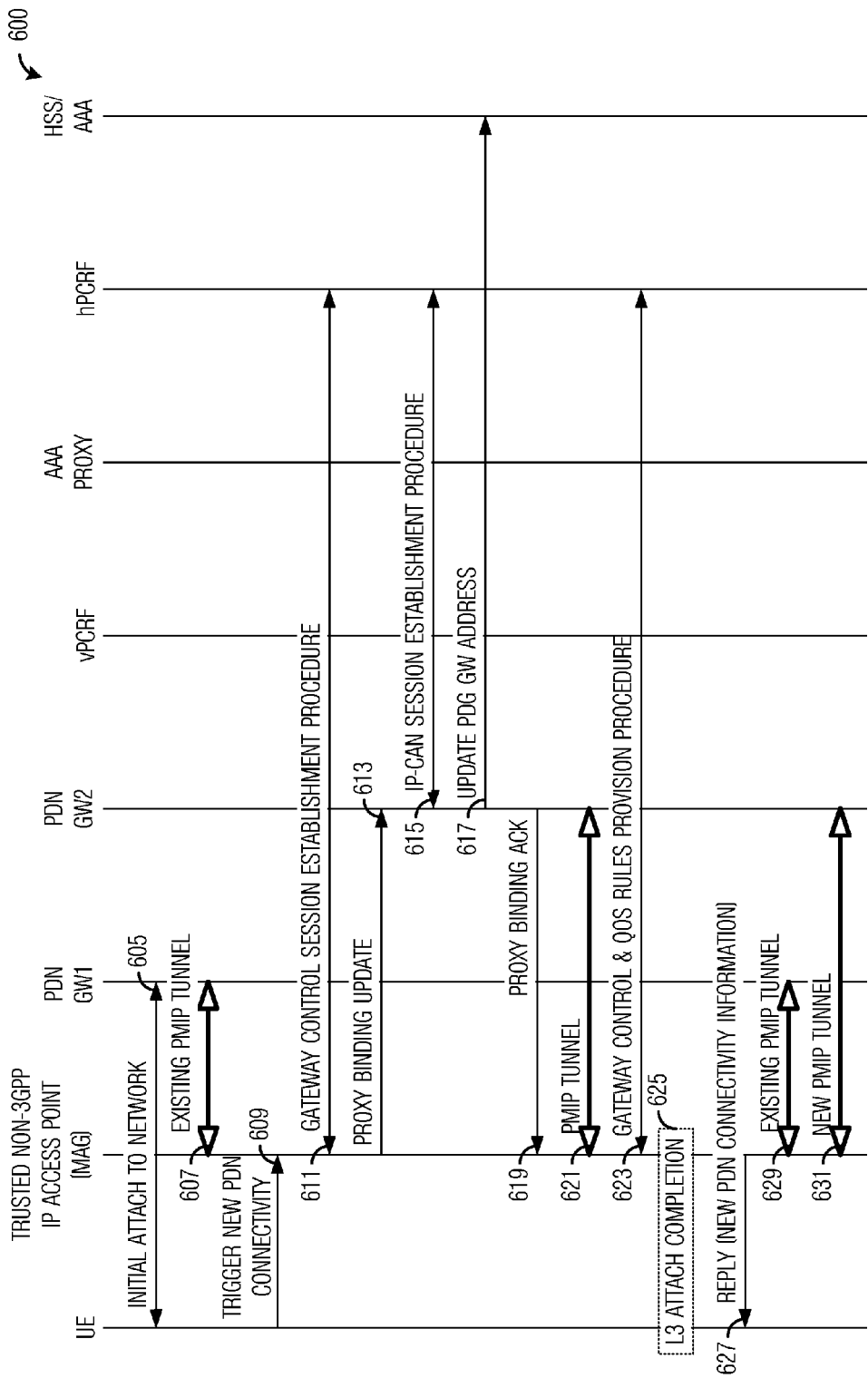
FIG. 6 is a diagram of a call flow in the establishment of a connection between a UE and a PDN.

FIG. 6 illustrates a call flow 600 in the establishment of a connection between a UE and a PDN. Call flow 600 may be indicative of messages exchanged between various components of a communications network in a UE-initiated connection to a PDN. The messages exchanged in call flow 600 follow the proxy mobile IP v6 (PMIPv6) protocol with an example of a 3GPP UE connecting to a non-3GPP network, such as the WiMAX network from an S2a interface as defined in the WiMAX network. Although call flow 600 focuses on PMIPv6 and an example connection via the S2a interface, the embodiments may also be applicable with PMIPv4 as well as other forms of protocol networks. Therefore, the discussion of PMIPv6 and example connection via S2a interface should not be construed as being limiting to either the scope or the spirit of the embodiments.

Call flow 600 may begin with a UE attaching to an access network (event 605). The UE may perform an initial attach to a trusted non-3GPP access point (MAG) and obtain IP connectivity to a PDN, for example, PDN 1, through PDN GW (PDN GW1) as indicated by the UE's user profile. An existing IP session tunnel may continue to be used for the connection to PDN GW1 (tunnel 607). The UE may send a trigger indicating that connectivity with a specified PDN is desired, for example, PDN 2 (event 609). The UE may provide information regarding the specified PDN using a APN.

The MAG may initiate a gateway control session establishment procedure with a home policy control and charging function (hPCRF) by providing information to the PCRF to correctly associate the MAG with an IP connectivity access network (IP-CAN) session and to convey subscription information related parameters to the PCRF (event 611). The MAG may also send a proxy binding update (PBU) message to PDN GW2 (event 613). The PDU message may include a mobile node network access identifier (MN-NAI), lifetime, access technology type, handover indicator, APN, generic routing encapsulation (GRE) key for downlink traffic, as well as additional information, including protocol configuration options and so on.

The PDN GW2 may then initiate the IP-CAN session establishment procedure with the hPCRF (event 615). The PDN GW2 may provide information to the hPCRF that may be used to properly identify the session and associate gateway control sessions established in event 611. The hPCRF may create IP-CAN session related information and responds to the PDN GW2 with policy and charging control (PCC) rules and event triggers.

The PDN GW2 may inform an authentication, authorization, and accounting (AAA) server of its identity as well as the APN corresponding to the UE's connection to the specified PDN (event 617). The connection between the UE and the specified PDN may now be uniquely identified and registered in a home subscriber server (HSS).

The PDN GW2 may process the PDU and create a binding cache entry for the UE (event 619). The PDN GW2 may also allocate an IP address for the UE (using MN-ID, APN-ID, and a parameter, such as counter value, nonce, system time value, identifier of the specified PDN, for example). The PDN GW2 may also send a proxy binding acknowledgement (PDA) message to the MAG. The PDA message may include information such as MN-NAI, lifetime, UE address information, GRE key for uplink traffic, as well as additional information, including protocol configuration options and so on. The PDA message may include the UE's IP address in IPv4 and/or IPv6.

A PMIPv6 tunnel may then be set up between the MAG and the PDN GW2 (tunnel 621). If QoS rules have changed, the hPCRF may update the QoS rules at a serving gateway (S-GW) (event 623)). The QoS rule update may be initiated by a gateway control session modification procedure. A Layer Three (L3) attach procedure may be completed by way of a non-3GPP access specific trigger (block 625). Additionally, IP connectivity between the UE and the PDN GW2 may be setup for both uplink and downlink directions.

The MAG may send a reply message to the UE (event 627). The reply message may include the IP address allocated to the UE by a gateway of the specified PDN, i.e., the PDN GW2. The UE may maintain its configuration for connectivity with any other previously established PDN. If a handover arises, the UE may be provided with the IP address obtained by the UE during PDN connectivity establishment over the 3GPP access network. The PMIPv6 tunnel (tunnel 631) is now complete between the MAG and the PDN GW2, while the existing tunnel (tunnel 629) is maintained.

Figures 7A, 7B, 7C:
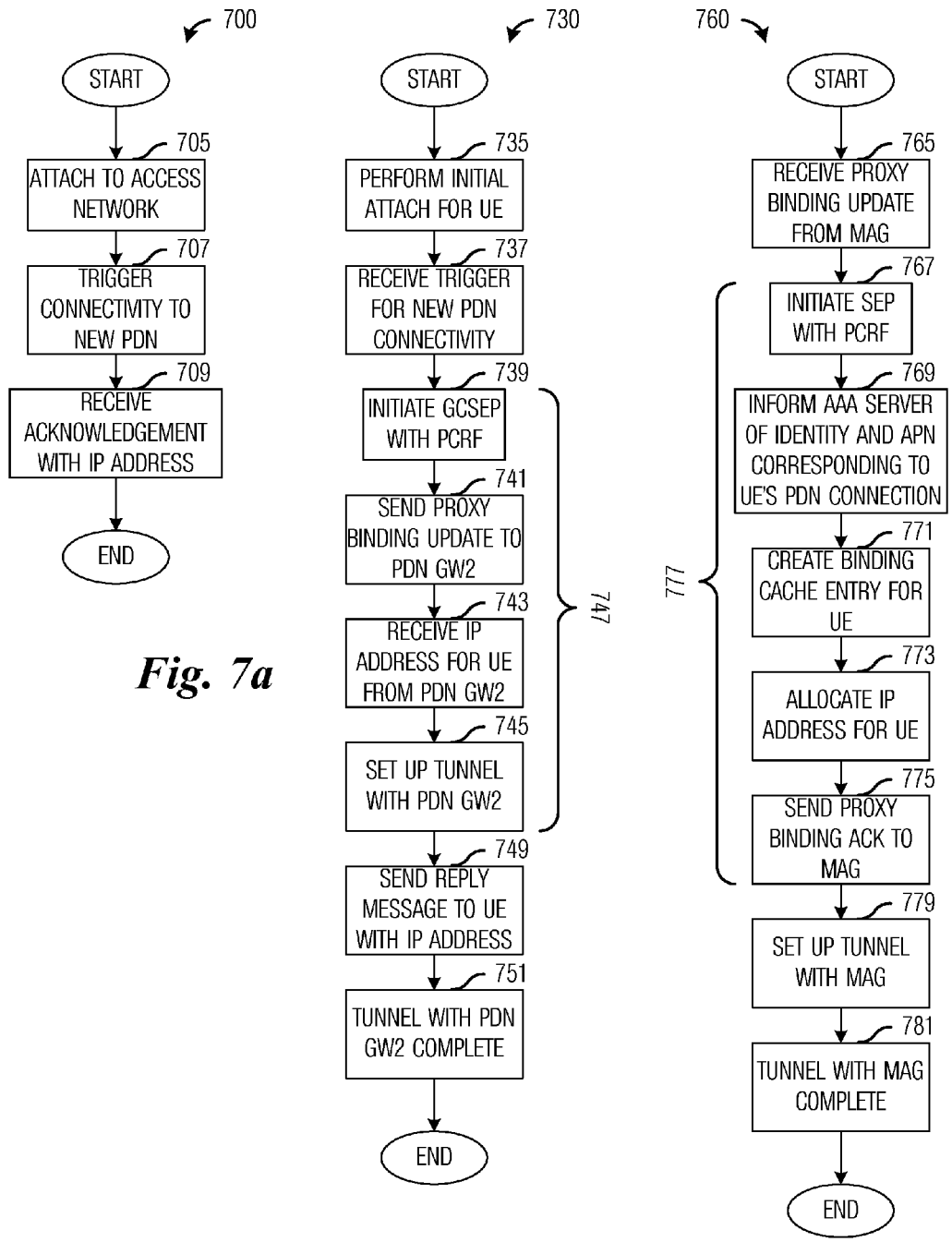
FIG. 7a is a flow diagram of UE operations in a UE-initiated connection to an additional PDN.
FIG. 7b is a flow diagram of MAG operations in a UE-initiated connection to an additional PDN.
FIG. 7c is a flow diagram of PDN GW operations in a UE-initiated connection to an additional PDN.

FIG. 7a illustrates a flow diagram of UE operations 700 in a UE-initiated connection to an additional PDN. UE operations 700 may be indicative of operations occurring in a UE as the UE initiates a connection to an additional PDN after a connection has already been established to a first PDN. UE operations 700 may occur while the UE is in normal operations and desires to connect to a PDN to which it is not currently connected.

UE operations 700 may begin with the UE attaching to an access network (block 705). The UE may initially attach to a trusted non-3GPP access point with mobile access gateway functionality (MAG). From the MAG, the UE may obtain connectivity to the first PDN through a first PDN GW (i.e., PDN GW1). The network attach also creates an APN. A PMIP tunnel (either PMIPv4 or PMIPv6) created during the network attach may be retained as a connection between the UE and the first PDN.

The UE may then trigger connectivity with an additional PDN (block 707). The UE may trigger the connectivity to the additional PDN by sending a message to the MAG. The message may contain information regarding the additional PDN. The UE may use the APN created during the network attach (block 705) to send the message.

The UE may then receive an acknowledgement to the trigger (block 709). If the connection to the additional PDN is granted, then the acknowledgement to the trigger (sent by the MAG) may contain an IP address for the UE. The IP address for the UE may have been allocated to the UE by a gateway for the additional PDN (i.e., PDN GW2) and may have been allocated based on the UE's identification (MN-ID), the APN's identification (APN-ID), and a parameter, such as a counter value, a nonce, a system time value, an identifier of the additional PDN, or so on. The IP address of the UE may be used to route transmissions to the UE from the PDN. UE operations 700 may then terminate.

FIG. 7b illustrates a flow diagram of MAG operations 730 in a UE-initiated connection to an additional PDN. MAG operations 730 may be indicative of operations occurring in a MAG as a UE initiates a connection to an additional PDN after a connection has already been established between the UE and a first PDN. MAG operations 730 may occur while the MAG is in normal operations and the UE desires to connect to a PDN to which it is not currently connected.

MAG operations 730 may begin with the MAG participating in an initial network attach with the UE (block 735). The MAG may serve as an access gateway for the UE to connect to a first PDN through a first PDN GW (i.e., PDN GW1). The network attach also creates an APN and a PMIP (either PMIPv4 or PMIPv6) tunnel created during the network attach may be retained as a connection between the UE and the first PDN.

The MAG may then receive a message from the UE, the message containing an indication that the UE wishes to trigger a connection with the additional PDN (block 737). The message may also contain information regarding the additional PDN and the UE may use the APN created during the network attach to send the message. The MAG may initiate a gateway control session establishment procedure with a home policy control and charging function (hPCRF) by providing information to the PCRF to correctly associate the MAG with an IP connectivity access network (IP-CAN) session and to convey subscription information related parameters to the PCRF (block 739).

The MAG may also send a proxy binding update (PBU) message to a PDN GW, i.e., PDN GW2, of the additional PDN (block 741). The PDU message may include a mobile node network access identifier (MN-NAI), lifetime, access technology type, handover indicator, APN, generic routing encapsulation (GRE) key for downlink traffic, as well as additional information, including protocol configuration options and so on. The MAG may receive a message (a proxy binding acknowledgement, for example) from the PDN GW2, the message containing an IP address allocated by the PDN GW2 to the UE (block 743). The IP address for the UE may have been allocated to the UE by the PDN GW2 and may have been generated using the UE's identification (MN-ID), the APN's identification (APN-ID), and a parameter, such as a counter value, a nonce, a system time value, or an identifier of the additional PDN.

The MAG may then set up a tunnel between the MAG and the PDN GW2 (block 745). The tunnel between the MAG and PDN GW2 however uses the APN created during the initial network attach (block 735). Collectively, blocks 739, 741, 743, and 745 may be referred to as connectivity forming 747.

The MAG may then send an acknowledgement message to the UE (in response to the UE's message containing the connectivity trigger) (block 749). The acknowledgement message may contain the IP address allocated to the UE from the PDN GW2. The tunnel between the MAG and the PDN GW2 may now be complete (block 751) and MAG operations 730 may terminate.

FIG. 7c illustrates a flow diagram of PDN GW operations 760 in a UE-initiated connection to an additional PDN. PDN GW operations 760 may be indicative of operations occurring in a PDN GW as a UE initiates a connection to an additional PDN to which the PDN GW is serving as a gateway, after a connection has already been established between the UE and a first PDN. PDN GW operations 760 may occur while the PDN GW is in normal operations and the UE desires to connect to a PDN to which it is not currently connected.

PDN GW operations 760 may begin with the PDN GW of the additional PDN, i.e., PDN GW2, receiving a proxy binding update (PDU) from a MAG (block 765). The PDU message may include a mobile node network access identifier (MN-NAI), lifetime, access technology type, handover indicator, APN, generic routing encapsulation (GRE) key for downlink traffic, as well as additional information, including protocol configuration options and so on.

The PDN GW2 may then initiate the IP-CAN session establishment procedure with the HPCRF (block 767). The PDN GW2 may provide information to the hPCRF that may be used to properly identify the session and associate gateway control sessions established earlier in the UE-initiated connection to the additional PDN. The hPCRF may create IP-CAN session related information and responds to the PDN GW2 with policy and charging control (PCC) rules and event triggers.

The PDN GW2 may inform an authentication, authorization, and accounting (AAA) server of its identity as well as the APN corresponding to the UE's connection to the additional PDN (block 769). The connection between the UE and the additional PDN may now be uniquely identified and registered in a home subscriber server (HSS).

The PDN GW2 may process the PDU and create a binding cache entry for the UE (block 771). The PDN GW2 may also allocate an IP address for the UE (based on a binding generated from MN-ID, APN-ID, and a parameter, such as counter value, nonce, system time value, identifier of the additional PDN, for example) (block 773). The PDN GW2 may also send a proxy binding acknowledgement (PDA) message to the MAG (block 775). The PDA message may include information such as MN-NAI, lifetime, UE address information, GRE key for uplink traffic, as well as additional information, including protocol configuration options and so on. The PDA message may include the UE's IP address in IPv4 and/or IPv6. Collectively, blocks 767, 769, 771, 773, and 775 may be referred to as authentication and IP address allocation 777.

The PDN GW2 may then set up a tunnel between the PDN GW2 and the MAG (block 779). The tunnel between the PDN GW2 and the MAG however uses the APN created earlier in the UE-initiated connection to the additional PDN. The tunnel between the PDN GW2 and the MAG may now be complete (block 781) and PDN GW operations 760 may terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operation, the method comprising:
    attaching, by the communications device, to a first packet data network through an access network, thereby creating an access point name;
    triggering a connection to a second packet data network through the access network, wherein the triggering occurs over the access point name; and
    receiving an acknowledgement to the trigger, wherein the acknowledgement comprises an address for the communications device,
    wherein the address is allocated by a gateway for the second packet data network, and
    wherein a value of the address is allocated based on a value of a binding generated from an identifier of the communications device, an identifier of the access point name, and a parameter.

2. The method of claim 1, wherein the parameter comprises a counter value, a nonce, a system time value, an identifier of the second packet data network, or a combination thereof.

3. The method of claim 2, wherein the parameter is a counter value associated with the communications device.

4. The method of claim 3, wherein the counter value is incremented each time the communications device triggers a connection to another packet data network.

5. The method of claim 3, wherein the counter value is decremented each time the communications device triggers a connection to another packet data network.

6. The method of claim 3, wherein the counter value is stored in a binding cache entry associated with the communications device.

7. The method of claim 1, wherein the triggering comprises transmitting a message to a mobility access gateway.

8. The method of claim 7, wherein the message comprises information related to the second packet data network.

9. A method for mobility access gateway (MAG) operation, the method comprising:
- receiving, by the MAG, a trigger for a connection to an alternative packet data network (PDN) from a communications device already connected to a first PDN, wherein the trigger is received on an access point name created during a connection of the communications device to the first PDN;
- forming the connection to the alternative PDN;
- receiving an address of the communications device from a gateway of the alternative PDN, wherein a value of the address is allocated based on a value of a binding generated from an identifier of the communications device, an identifier of the access point name, and a parameter; and
- sending a reply to the trigger, wherein the reply comprises the address of the communications device provided by the gateway of the alternative PDN.

10. The method of claim 9, wherein the parameter comprises a counter value, a nonce, a system time value, an identifier of the alternative packet data network, or a combination thereof.

11. The method of claim 9, wherein receiving a trigger comprises receiving a message comprising an indication that the communications device wants to connect to the alternative PDN.

12. The method of claim 9, wherein forming the connection to the alternative PDN comprises:
- initiating a gateway control session establishment procedure with a home policy control and charging function; and
- sending a proxy binding update to the gateway of the alternate PDN.

13. The method of claim 12, wherein the proxy binding update comprises the identifier of the communications device, the identifier of the access point, a generic routing encapsulation key, a connection lifetime, or an access technology type, or a combination thereof.

14. The method of claim 12, wherein forming the connection to the alternative PDN further comprises setting up a tunnel between the MAG and the gateway of the alternative PDN.

15. A method for packet data network gateway (PDN GW) operation, the method comprising:
- receiving, by the PDN GW, a proxy binding update from a mobility access gateway (MAG), the proxy binding update comprising a message requesting an establishing of a connection between the MAG and the PDN GW for a communications device over an access point name established during a previous establishing of a connection between the MAG and a PDN;
- authenticating the communications device;
- allocating an address for the communications device, wherein a value of the address is allocated based on a value of a binding generated from an identifier of the communications device, an identifier of the access point name, and a parameter; and
- establishing a tunnel between the PDN GW and the MAG.

16. The method of claim 15, wherein the parameter comprises a counter value, a nonce, a system time value, an identifier of the PDN GW or a combination thereof.

17. The method of claim 15, wherein the parameter is a counter value associated with the communications device, and wherein the counter value is stored in a binding cache entry associated with the communications device.

18. The method of claim 15, wherein the parameter is a system time value corresponding to when the PDN GW received the proxy binding update.

19. The method of claim 15, wherein the address is allocated by combining the identifier of the communications device, the identifier of the access point name, and the parameter.

20. The method of claim 19, wherein the combining comprises concatenating, hashing, adding, multiplying, or a combination thereof.

21. The method of claim 15, wherein authenticating the communications device comprises:
- initiating a session establishment procedure with a home policy control and charging function; and
- informing an authentication, authorization, and accounting server of the identity of the communications device and the identity of the access point name.

22. The method of claim 15, wherein allocating an address comprises:
- generating a binding based on the identifier of the communications device, the identifier of the access point name, and the parameter; and
- allocating the address based on the binding.

* * * * *